United States Patent
Lin (10) Patent No.: US 9,792,085 B2
(45) Date of Patent: Oct. 17, 2017

(54) METHOD FOR GROUPING PLAYING DEVICES AND TERMINAL APPARATUS

(71) Applicant: Guang Dong Oppo Mobile Telecommunications Corp., Ltd., Dongguan (CN)

(72) Inventor: Shangbo Lin, Dongguan (CN)

(73) Assignee: GUANG DONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 15/190,203

(22) Filed: Jun. 23, 2016

(65) Prior Publication Data
US 2017/0060522 A1    Mar. 2, 2017

(30) Foreign Application Priority Data

Aug. 25, 2015  (CN) .......................... 2015 1 0528111

(51) Int. Cl.
| H04R 27/00 | (2006.01) |
| G06F 3/16 | (2006.01) |
| H04W 8/24 | (2009.01) |

(52) U.S. Cl.
CPC .............. G06F 3/165 (2013.01); G06F 3/162 (2013.01); H04W 8/24 (2013.01)

(58) Field of Classification Search
CPC ........... G06F 3/165; G06F 3/162; H04W 8/24
See application file for complete search history.

(56) References Cited

U.S. PATENT DOCUMENTS

| 2002/0168938 | A1 | 11/2002 | Chang |
| 2005/0286546 | A1* | 12/2005 | Bassoli ............... G11B 27/002 370/432 |
| 2009/0083362 | A1 | 3/2009 | Svendsen et al. |
| 2012/0185072 | A1* | 7/2012 | Millington ............ H04J 3/0664 700/94 |
| 2014/0037107 | A1 | 2/2014 | Marino, Jr. et al. |
| 2017/0006331 | A1* | 1/2017 | Jairath .................. H04L 7/0037 |

FOREIGN PATENT DOCUMENTS

| CN | 101631034 A | 1/2010 |
| CN | 103295604 A | 9/2013 |
| CN | 104507005 A | 4/2015 |
| CN | 104575539 A | 4/2015 |
| CN | 104615333 A | 5/2015 |
| CN | 104698884 A | 6/2015 |

\* cited by examiner

*Primary Examiner* — Muhammad N Edun
(74) *Attorney, Agent, or Firm* — JMB Davis Ben-David (57) ABSTRACT

A method for grouping playing devices and terminal apparatus includes acquiring a user setting assigned to a plurality of play time periods of N playing devices in a wireless music system and determining a current time. It is determined which the play time periods of the N playing devices include a first target play time period encompassing the current time. The playing devices of the N playing devices are grouped corresponding to the first target play time period into a first play group.

20 Claims, 9 Drawing Sheets

METHOD FOR GROUPING PLAYING DEVICES AND TERMINAL APPARATUS

CROSS-REFERENCE TO RELATED APPLICATIONS

Benefit is claimed to China Patent Application No. 201510528111.4, filed Aug. 25, 2015, the contents of which are incorporated by reference herein in their entirety.

BACKGROUND

Field

The present disclosure relates to an audio playing method and apparatus, and more particularly to a method for grouping playing devices using a terminal apparatus.

Background

A network music system typically includes a plurality of playing devices. The playing devices may construct a private network using wireless communication technology where the private network provides an interface port to couple the internet. When the interface port is coupled to one or more routers, the playing devices are capable of accessing network music resources within the private network so that a user accessing the playing devices within the private network can manage the playing devices using a dedicated application program in a terminal apparatus, such as an intelligent terminal. Management procedures of playing devices include increasing or decreasing the number of playing devices, searching music, creating a playlist, and controlling a variety of play statuses of the playing devices.

In fact, when the user groups the playing devices using the terminal apparatus, it is required to add a playing device one by one into a specific playing group. For example, a playing device A, a playing device B and a playing device C are sequentially added into a first playing group, or a playing device D and a playing device E are sequentially added into a second playing group. In this case, the user needs to search the playing devices to add found playing devices to the playing group, thereby resulting in quite a complex procedure and poor user experience.

BRIEF DESCRIPTION OF THE DRAWINGS

To describe the technical solutions of the present application more clearly, the accompanying drawings for illustrating at least one embodiment will be introduced briefly in the following. Apparently, the accompanying drawings in the following description are only some embodiments of the present application, and a person of ordinary skill in the art may obtain other drawings based on these accompanying drawings without creative efforts.

DETAILED DESCRIPTION OF THE PREFERRED EMBODIMENTS

The following embodiments refer to the accompanying drawings for exemplifying specific implementable embodiments of the present disclosure. It should be noted that the exemplary described embodiments are configured to describe and understand the present disclosure, but the present disclosure is not limited thereto.

Based on the above-mentioned drawbacks, one objective of the present disclosure is to provide a method for grouping playing devices and terminal apparatus for simplifying the grouping procedure and improving user experience.

A first embodiment of the present disclosure provides a method for grouping playing devices, including:

acquiring a user setting input via a first acquisition unit (e.g., an input device) of the terminal apparatus, the user setting assigning to a plurality of play time periods of N playing devices in a wireless music system, wherein N is an integer greater than one and the wireless music system includes the terminal apparatus wirelessly integrated;

determining a current time to be stored in a storage device of the terminal apparatus using a first determination unit (e.g., a processor) of the terminal apparatus;

determining which play time periods of the N playing devices include a first target play time period encompassing the current time in the storage device using a second determination unit (e.g., the processor) of the terminal apparatus; and in response to the first target play time period encompassing the current time, grouping at least one playing device of the N playing devices corresponding to the first target play time period into a first play group using a first grouping unit (e.g., the processor) of the terminal apparatus.

In at least one embodiment, the method of grouping at least one playing device of the N playing devices corresponding to the first target play time period into the first play group further includes determining K playing devices corresponding to the first target play time period using a third determination unit (e.g., the processor) of the terminal apparatus, wherein K is an integer greater than or equal to one; and grouping the K playing devices into the first play group using a first grouping sub-unit (e.g., the processor) of the terminal apparatus.

In at least one embodiment, the method of determining which the play time periods of the N playing devices including the first target play time period encompassing the current time includes detecting that a starting time of a play time period "i" in the play time periods of the N playing devices is before the current time and an end time of the play time period "i" is after the current time using a detecting unit (e.g., the processor) of the terminal apparatus, wherein the play time period "i" is any one of play time periods of the N playing devices; and if the starting time of the play time period "i" is before the current time and the end time of the play time period "i" is after the current time, determining which the play time period "i" is the first target play time period using a second determination sub-unit (e.g., the processor) of the terminal apparatus.

In at least one embodiment, after grouping at least one playing device of the N playing devices corresponding to the first target play time period into the first play group, the method further includes determining an invalid time which is the end time of the play time period "i" of a playing device using a fourth determination unit (e.g., the processor) of the terminal apparatus when the play time period "i" of the first target play time period is detected to be invalid; determining which the play time periods of the N playing devices include a second target play time period with a next second of the invalid time using a fifth determination unit (e.g., the processor) of the terminal apparatus; and grouping at least one playing device of the N playing devices corresponding to the second target play time period into a second play group using a second grouping unit (e.g., the processor) of the terminal apparatus.

In at least one embodiment, after grouping at least one playing device of the N playing devices corresponding to the first target play time period into the first play group, the method further includes acquiring a predetermined time inputted by the user using a second acquisition unit (e.g., an input device) of the terminal apparatus; determining which the play time periods of the N playing devices include a third target play time period encompassing the predetermined time using a sixth determination unit (e.g., the processor) of the terminal apparatus; and grouping at least one playing device of the N playing devices corresponding to the third target play time period into a third play group using a third grouping unit (e.g., the processor) of the terminal apparatus.

A second embodiment of the present disclosure provides a terminal apparatus, including:

a first determination unit configured to determine a current time;

a second determination unit configured to determine which play time periods of the N playing devices acquired by the first acquisition unit include a first target play time period encompassing the current time determined by the first determination unit; and a first grouping unit configured to group at least one playing device of the N playing devices corresponding to the first target play time period determined by the second determination unit into a first play group in response to the first target play time period encompassing the current time.

In at least one embodiment, the first grouping unit further includes a third determination unit configured to determine K playing devices corresponding to the first target play time period, wherein K is an integer greater than or equal to one; and a first grouping sub-unit configured to group the K playing devices determined by the third grouping unit into the first play group.

In at least one embodiment, the second determination unit further includes a detecting unit configured to detect that a starting time of a play time period "i" in the play time periods of the N playing devices acquired by the first acquisition unit is before the current time and an end time of the play time period "i" is after the current time, wherein the play time period "i" is any one of play time periods of the N playing devices; and a second determination sub-unit configured to determine which the play time period "i" is the first target play time period if the detecting unit detects that the starting time of the play time period "i" in the play time periods of N playing devices acquired by the first acquisition unit is before the current time and an end time of the play time period "i" is after the current time.

In at least one embodiment, the terminal apparatus further includes a fourth determination unit configured to determine an invalid time which is the end time of the play time period "i" of a playing device when the play time period "i" of the first target play time period is detected to be invalid; a fifth determination unit configured to determine which the play time periods of the N playing devices acquired by the first acquisition unit include a second target play time period with a next second of the invalid time determined by the fourth determination unit; and a second grouping unit configured to group at least one playing device of the N playing devices corresponding to the second target play time periods, which are determined by the fifth determination unit, into a second play group.

In at least one embodiment, the terminal apparatus further includes a second acquisition unit configured to acquire a predetermined time inputted by the user; a sixth determination unit configured to determine which the play time periods of the N playing devices include a third target play time period of the predetermined time acquired by the second acquisition unit; and a third grouping unit configured to group the playing devices of N playing devices corresponding to the third target play time period, which are determined by the sixth determination unit, into a third play group.

In at least one embodiment, the terminal apparatus further includes a second acquisition unit configured to acquire a predetermined time inputted by the user; a sixth determination unit configured to determine which the play time periods of the N playing devices include a third target play time period of the predetermined time acquired by the second acquisition unit; and a third grouping unit configured to group the playing devices of N playing devices corresponding to the third target play time period, which are determined by the sixth determination unit, into a third play group.

In at least one embodiment, the terminal apparatus further includes a second acquisition unit configured to acquire a predetermined time inputted by the user; a sixth determination unit configured to determine which the play time periods of the N playing devices include a third target play time period of the predetermined time acquired by the second acquisition unit; and a third grouping unit configured to group the playing devices of N playing devices corresponding to the third target play time period, which are determined by the sixth determination unit, into a third play group.

A computing device including a computer readable media and a processor, wherein the computer readable media stores therein at least one application program, the computing device executes the at least one application program using the processor, and the computing device performs a method including:

receiving a user setting input via an input device of a terminal apparatus, the user setting assigning a plurality of play time periods of N playing devices in a wireless music system, wherein N is an integer greater than one and the wireless music system includes the terminal apparatus wirelessly integrated;

determining, via a processor of the terminal apparatus, a current time to be stored in a storage device of the terminal apparatus; and in response to play time periods of the N playing devices including a first target play time period encompassing the current time stored in the storage device, grouping at least one playing device of the N playing devices corresponding to the first target play time period into a first play group using the processor of the terminal apparatus.

In at least one embodiment, the computer device further includes the processor of the terminal apparatus configured to detect that a starting time of a play time period "i" in the play time periods of the N playing devices is before the current time and an end time of the play time period "i" is after the current time, wherein the play time period "i" is any one of play time periods of the N playing devices by the at least one application program; and if the starting time of the play time period "i" is before the current time and the end time of the play time period "i" is after the current time, the processor of the terminal apparatus being configured to determine which the play time period "i" is the first target play time period by the at least one application program.

In at least one embodiment of the present disclosure, a terminal apparatus is selected from an electronic device, such as a notebook computer, a smartphone, a tablet computer and an intelligent wearable device, including but not limited to the above-described terminals. A system of the terminal apparatus is defined as an operating system including ANDROID system, SYMBIAN system, WINDOWS system and IOS system (a mobile operating system developed by APPLE), where an ANDROID terminal refers to a terminal of an ANDROID system and a SYMBIAN terminal refers to a terminal of a SYMBIAN system, but not limited thereto. The terminal apparatuses are represented by examples only herein, including but not limited to the above-described terminal apparatuses.

Accompanied with FIGS. 1-6, methods for grouping playing devices and terminal apparatus provided by at least one embodiment of the present disclosure are described in the following.

Figure 1:
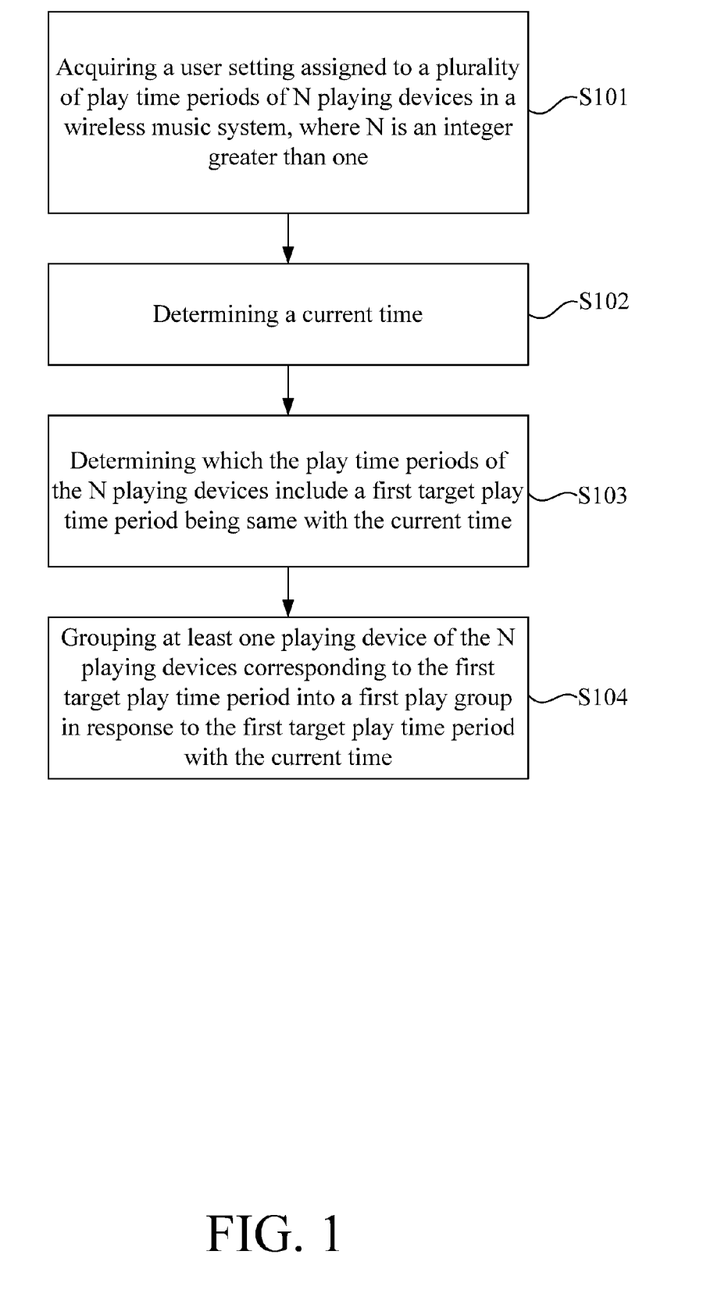
FIG. 1 is a flowchart of a method for grouping playing devices and terminal apparatus according to a first embodiment of the present disclosure.

FIG. 1 is a flowchart of a method for grouping playing devices and terminal apparatus according to a first embodiment of the present disclosure. The method can begin at block S101.

In block S101, a first acquisition unit 501 in FIGS. 5A-5E (e.g., an input device in FIG. 6) acquires a user setting for inputting, wherein the user setting assigning a plurality of play time periods of N playing devices in a wireless music system of the terminal apparatus and N is an integer greater than one. The play time period is defined as a set time interval that music is played by one or more devices. The wireless music system includes the terminal apparatus wirelessly integrated.

In one embodiment, the wireless music system includes a plurality of playing devices, such as the number of N playing devices, where N is an integer greater than one. The terminal can acquire a user setting assigned to play time periods of N playing devices within the wireless music system where N playing devices may be all or a portion of the playing devices within the wireless music system. Each playing device of the N playing devices includes at least one play time period.

In block S102, a first determination unit 502 in FIGS. 5A-5E of the terminal apparatus determines a current time to be stored in a storage device (e.g., a storage device in FIG. 6) of the terminal apparatus.

In block S103, a second determination unit 503 in FIGS. 5A, 5B, 5D, and 5E of the terminal apparatus determines which the play time periods of the N playing devices include a first target play time period having the current time in the storage device.

In one embodiment, the terminal regards the playing time period having the current time, included in the play time periods of the N playing devices, as the first target play time period. For example, if the current time is 13:05 and a specific play time period is 11:00 to 14:00, the play time period regarded as the first target play time period includes the current time.

Figure 5A:
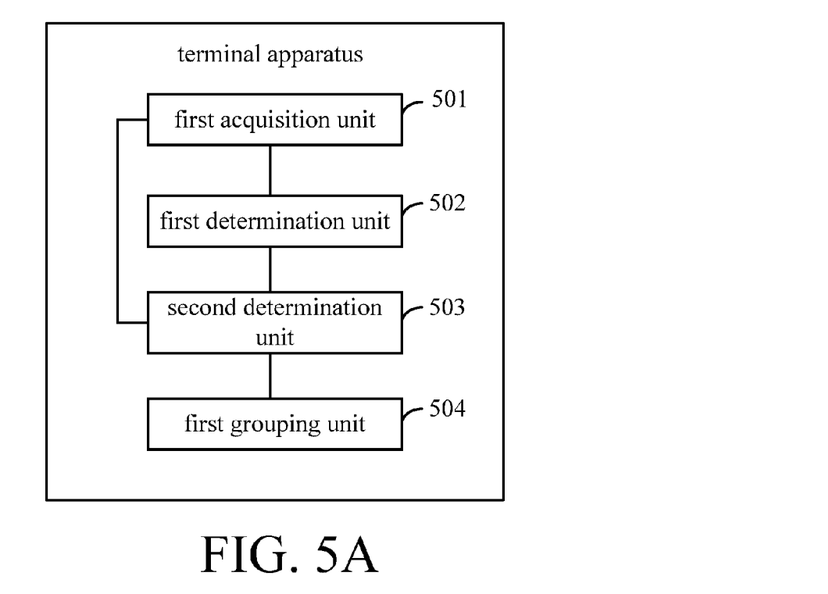
FIG. 5A is a block diagram of a terminal apparatus according to a first embodiment of the present disclosure.
Figure 5B:
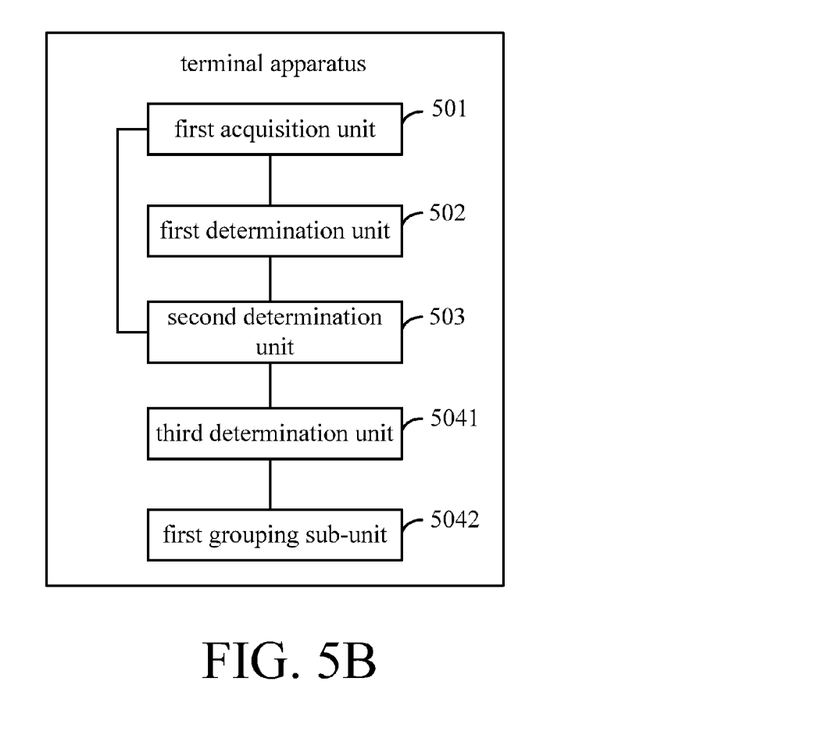
FIG. 5B is a block diagram of another terminal apparatus according to the first embodiment of the present disclosure.
Figure 5C:
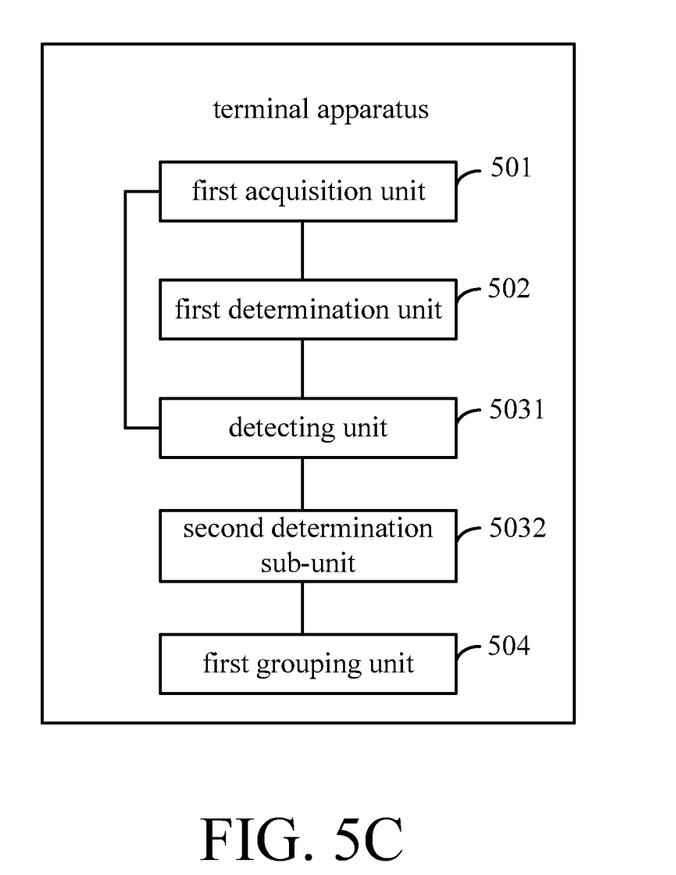
FIG. 5C is a block diagram of still another terminal apparatus according to the first embodiment of the present disclosure.

In block S104, in response to the first target play time period encompassing the current time, the playing devices of N playing devices corresponding to the first target play time period are grouped into the first play group by using a first grouping unit 504 in FIGS. 5A and 5C of the terminal apparatus.

In detail, the terminal is capable of grouping the playing devices of N playing devices corresponding to the first target play time period into a first play group.

Figure 5D:
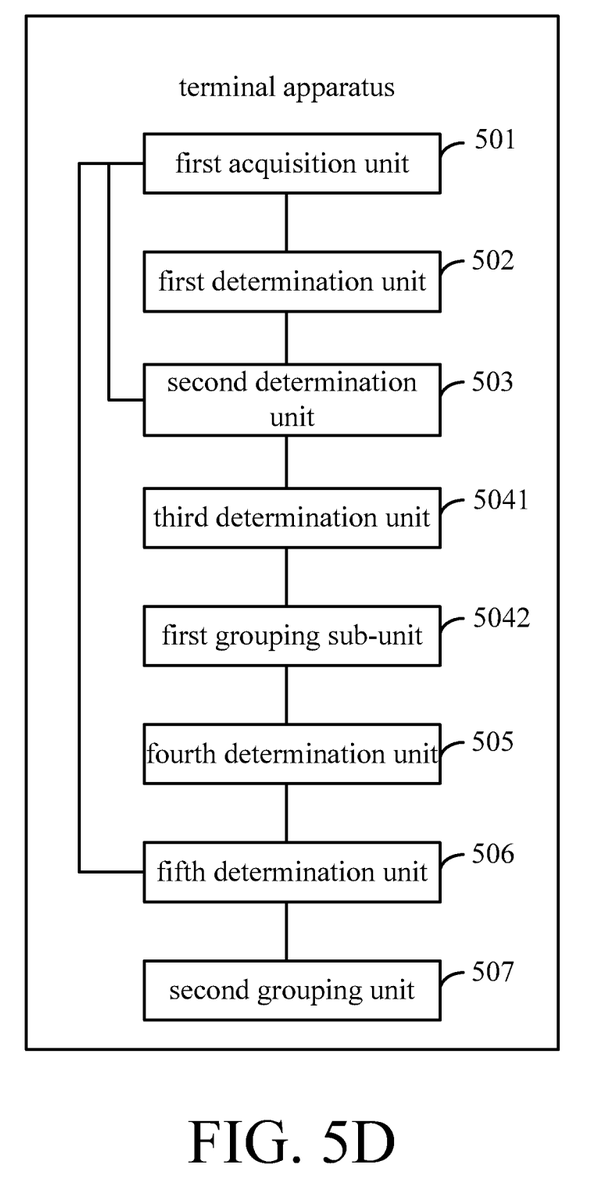
FIG. 5D is a block diagram of still another terminal apparatus according to the first embodiment of the present disclosure.
Figure 5E:
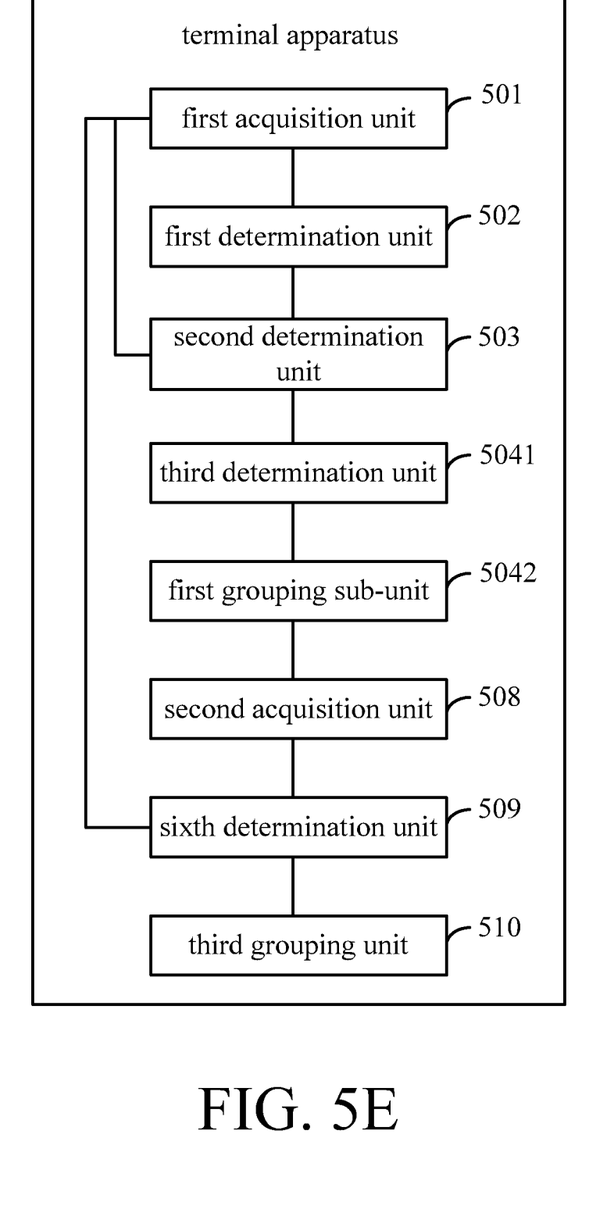
FIG. 5E is a block diagram of still another terminal apparatus according to the first embodiment of the present disclosure.

In one embodiment, the terminal is capable of determining K playing devices corresponding to the first target play time period to form the first play group using a third determination unit 5041 in FIGS. 5B, 5D and 5E of the terminal apparatus, where K is an integer greater than or equal to one. Furthermore, the terminal adds the K playing devices into a play group, which is the first play group, using a first grouping sub-unit 5042 in FIGS. 5B and 5E of the terminal apparatus.

For example, the terminal acquires play time periods of three playing devices in the wireless music system where the play time periods of playing device "A" may be configured as 7:00-9:00, 11:00-13:00 and 19:00-22:00, the play time period of playing device "B" may be configured as 19:00-23:00, and the play time period of playing device "C" may be configured as 0:00-24:00. When the terminal determines that the current time is 12:00 noon, the terminal defines the first target play time periods to be 11:00-13:00 and 0:00-24:00 and the playing devices of N playing devices corresponding to the first target play time periods are grouped into the first play group including playing device "A" and playing device "C". Furthermore, while the terminal forms the first play group, the terminal is capable of controlling the devices in first play group to play music synchronously.

In at least one embodiment of the present disclosure, play time periods to be played by N playing devices in the wireless music system assigned by a user setting is firstly acquired where N is an integer greater than one. Then the current time is determined, and it is determined which the play time periods of the N playing devices include a first target play time period having the current time. The playing devices of N playing devices corresponding to the first target play time periods form a first play group. If the embodiments of the present disclosure are implemented, in the wireless music system, the playing devices corresponding to the first target time periods of the play time periods which encompass the current time are grouped into a play group for simplifying the grouping procedure and improving user experience.

Figure 2:
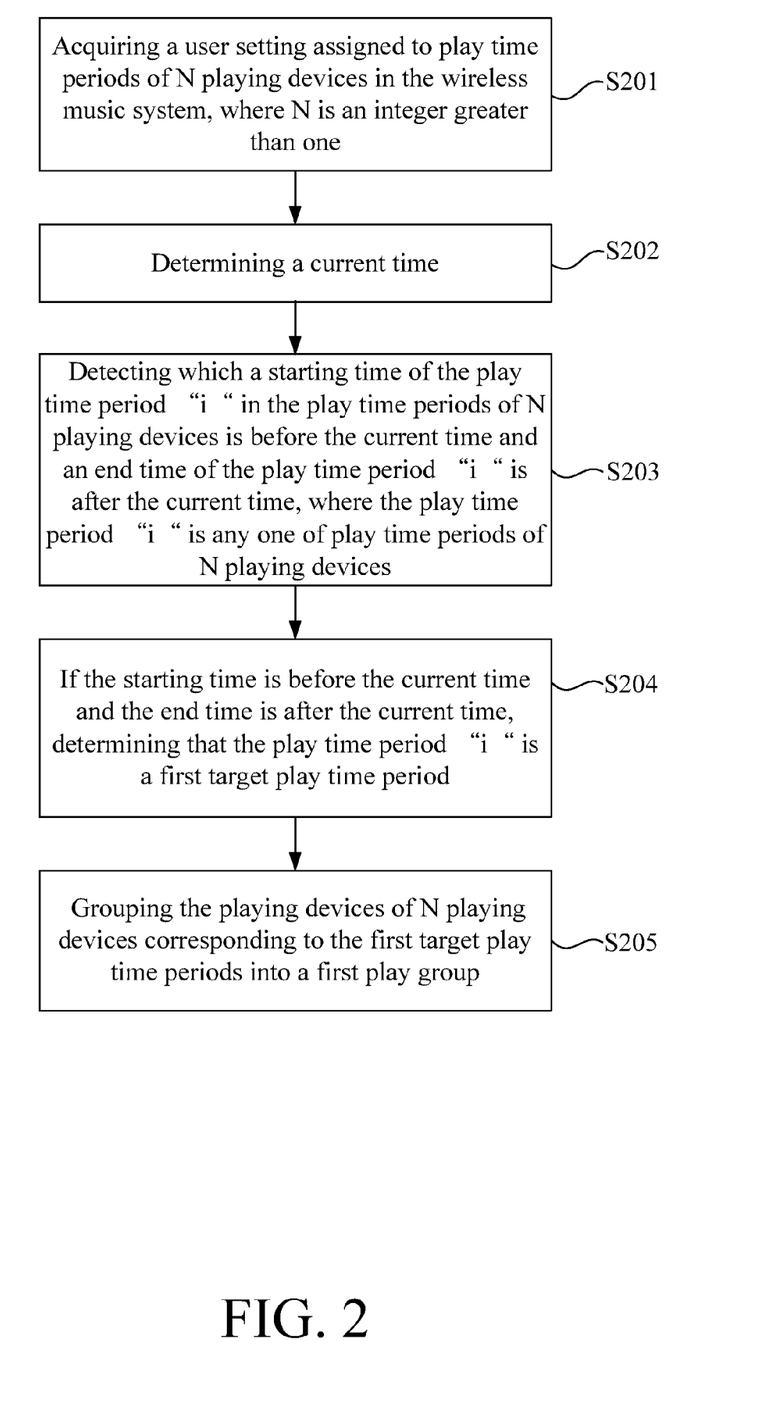
FIG. 2 is a flowchart of a method for grouping playing devices and terminal apparatus according to a second embodiment of the present disclosure.

FIG. 2 is a flowchart of a method for grouping playing devices and terminal apparatus according to a second embodiment of the present disclosure. The method can begin at block S201.

In block S201, a user setting assigned to play time periods of N playing devices in the wireless music system is acquired where N is an integer greater than one.

In one embodiment, the wireless music system includes a plurality of playing devices, such as the number of N playing devices, where N is an integer greater than one. The terminal can acquire a user setting assigned to play time periods of N playing devices within the wireless music system where N playing device may be all or a portion of the playing devices within the wireless music system. Each playing device of the N playing devices includes at least one play time period.

In block S202, a current time is determined.

In block S203, a detecting unit 5031 in FIG. 5C of the terminal apparatus detects that a starting time of the play time period "i" in the play time periods of N playing devices is before the current time and an end time of the play time period "i" is after the current time, where the play time period "i" is any one of play time periods of N playing devices.

In one embodiment, the terminal detects whether a starting time of the play time period "i" in the play time periods of N playing devices is before the current time and an end time of the play time period "i" is after the current time where the play time period "i" is any one of play time periods of N playing devices. In one case, if the current time is 13:05:00 and a specific play time period is 11:00-14:00, the current time 13:05:00 is after the starting time 11:00 of the play time period and before the end time 14:00 of the play time period. In another case, if the current time is 23:55:40 and some play time period is 23:00-04:00 where the time 23:00 is the starting time of the play time period and the time 04:00 is the end time of play time period, the current time 23:55:40 is after the starting time 23:00 of the play time period and before the end time 04:00 of the play time period.

In block S204, if the starting time of the play time period "i" in the play time periods of N playing devices is before the current time and the end time of the play time period "i" is after the current time, it is determined that the play time period "i" is a first target play time period by using a second determination sub-unit 5032 in FIG. 5C of the terminal apparatus.

In detail, if the terminal determines that the starting time of the play time period "i" is earlier than the current time and the end time of the play time period "i" is later than the current time, it is determined that the play time period "i" is a first target play time period.

In block S205, the playing devices of N playing devices corresponding to the first target play time periods are grouped into a first play group using a first grouping unit 504 in FIGS. 5A and 5C of the terminal apparatus.

In one embodiment, the terminal is capable of determining K playing devices corresponding to the first target play time period to form the first play group where K is an integer greater than or equal to one. Furthermore, the terminal adds the K playing devices into a play group, which is the first play group.

For example, the terminal acquires play time periods of three playing devices in the wireless music system where the play time periods of playing device "A" may be configured as 7:00-9:00, 11:00-13:00 and 19:00-22:00, the play time period of playing device "B" may be configured as 19:00-23:00, and the play time period of playing device "C" may be configured as 0:00-24:00. When the terminal determines that the current time is 12:00 noon, the terminal defines that the first target play time periods to be 11:00-13:00 and 0:00-24:00 and the playing devices of N playing devices corresponding to the first target play time periods are grouped into the first play group including playing device "A" and playing device "C". Furthermore, while the terminal forms the first play group, the terminal is capable of controlling devices in the first play group to play music synchronously.

In some embodiments of the present disclosure, a user setting assigned to play time periods of N playing devices in the wireless music system is acquired where N is an integer greater than one, the current time is determined, and it is detected whether a starting time of the play time period "i" in the play time periods of N playing devices is before the current time and an end time of the play time period "i" is after the current time where the play time period "i" is any one of play time periods of N playing devices. If the starting time of the play time period "i" is before the current time and the end time of the play time period "i" is after the current time, it is determined that the play time period "i" is a first target play time period, and the playing devices of N playing devices corresponding to the first target play time periods are grouped into a first play group. If at least one embodiment of the present disclosure is implemented, in the wireless music system, the playing devices corresponding to the first target play time periods of the play time periods which encompass the current time are grouped into a play group for simplifying the grouping procedure and improving user experience.

Figure 3:
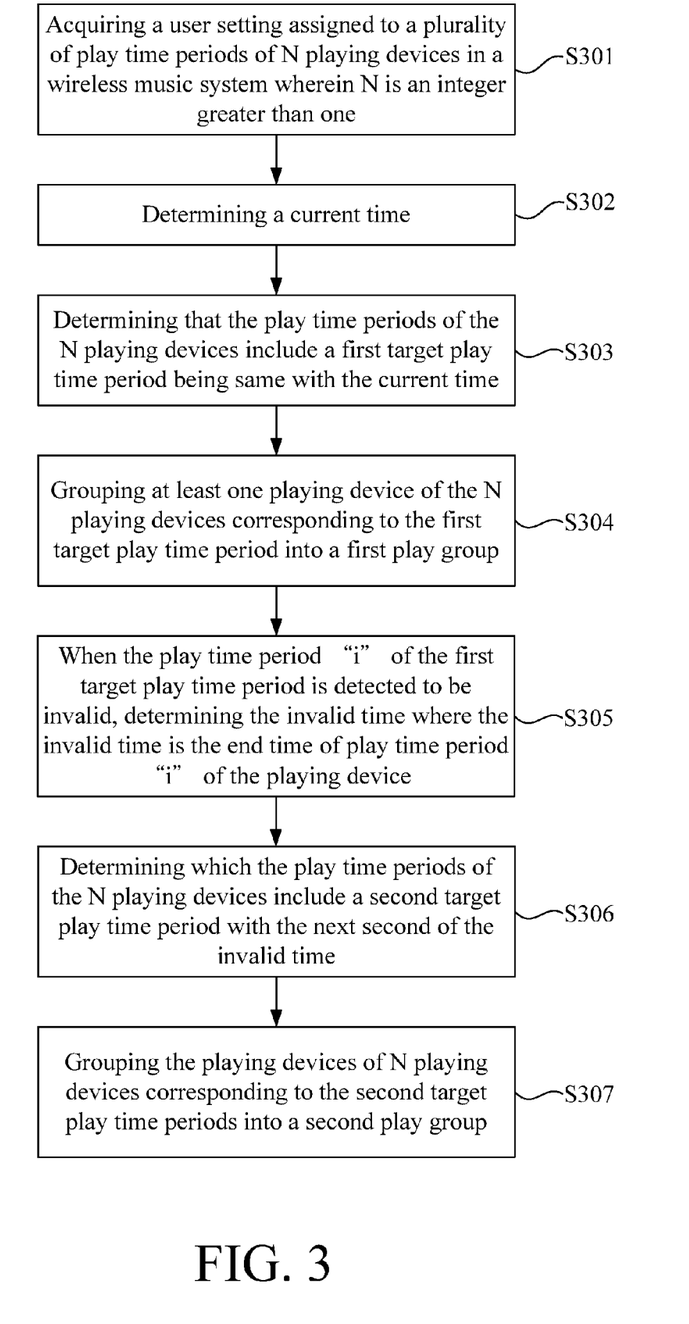
FIG. 3 is a flowchart of a method for grouping playing devices and terminal apparatus according to a third embodiment of the present disclosure.

FIG. 3 is a flowchart of a method for grouping playing devices and terminal apparatus according to a third embodiment of the present disclosure. The method includes the following blocks.

This third embodiment includes blocks S301-S304 similar to the first embodiment and will not be discussed in detail herein. The detailed descriptions of blocks S301-S304 refer to blocks S101-S104 respectively depicted in FIG. 1.

In block S305, when the play time period "i" of the first target play time period is detected to be invalid, the invalid time is determined using a fourth determination unit 505 in FIG. 5D of the terminal apparatus, where the invalid time is the end time of play time period "i" of the playing device.

In detail, when there are two first target play time periods and the play time period "i" of one of the two first target play time periods is detected to be invalid, the invalid time is determined and the invalid time is the end time of play time period "i" of the playing devices.

For example, the terminal acquires play time periods of three playing devices in the wireless music system where the play time periods of playing device "A" may be configured as 7:00-9:00, 11:00-13:00 and 19:00-22:00, the play time period of playing device "B" may be configured as 19:00-23:00, and the play time period of playing device "C" may be configured as 0:00-24:00. When the terminal determines that the current time is 12:00 noon, the terminal defines that the first target play time periods are 11:00-13:00 and 0:00-24:00 and the playing devices of N playing devices corresponding to the first target play time periods are grouped into the first play group including playing device "A" and playing device "C". Furthermore, if the play time period 11:00-13:00 of first target play time period is detected to be invalid in the time 13:00, the end time 13:00 is determined to be the invalid time of the playing devices "A" and "C".

In block S306, determining which the play time periods of the N playing devices include a second target play time period with the next second of the invalid time using a fifth determination unit 506 in FIG. 5D of the terminal apparatus.

In one embodiment, the terminal regards the playing time periods encompassing the current time, included in the play time periods of the N playing devices, as the first target play time period. For example, if the current time is 13:05 and a specific play time period is 11:00 to 14:00, the play time period regarded as the first target play time period includes the current time.

In block S307, the playing devices of N playing devices corresponding to the second target play time periods are grouped into a second play group using a second grouping unit 507 in FIG. 5D of the terminal apparatus.

In at least one embodiment of the present disclosure, a user setting assigned to play time periods of N playing devices in the wireless music system is acquired where N is an integer greater than one, the current time is determined, and it is determined which the play time periods of the N playing devices include a first target play time period; the playing devices of N playing devices corresponding to the first target play time periods form a first play group. When the play time period "i" of the first target play time period is detected to be invalid, the invalid time is determined where the invalid time is the end time of play time period "i" of the playing device. It is determined which the play time periods of the N playing devices include a second target play time period with the next second of the invalid time, and the playing devices of N playing devices corresponding to the second target play time periods form a second play group. If at least one embodiment of the present disclosure is implemented, N playing devices including the play time period with the next second of the invalid time are re-assembled to be a play group when the play time period of the first target play time period is detected to be invalid for simplifying the grouping procedure and improving user experience.

Figure 4:
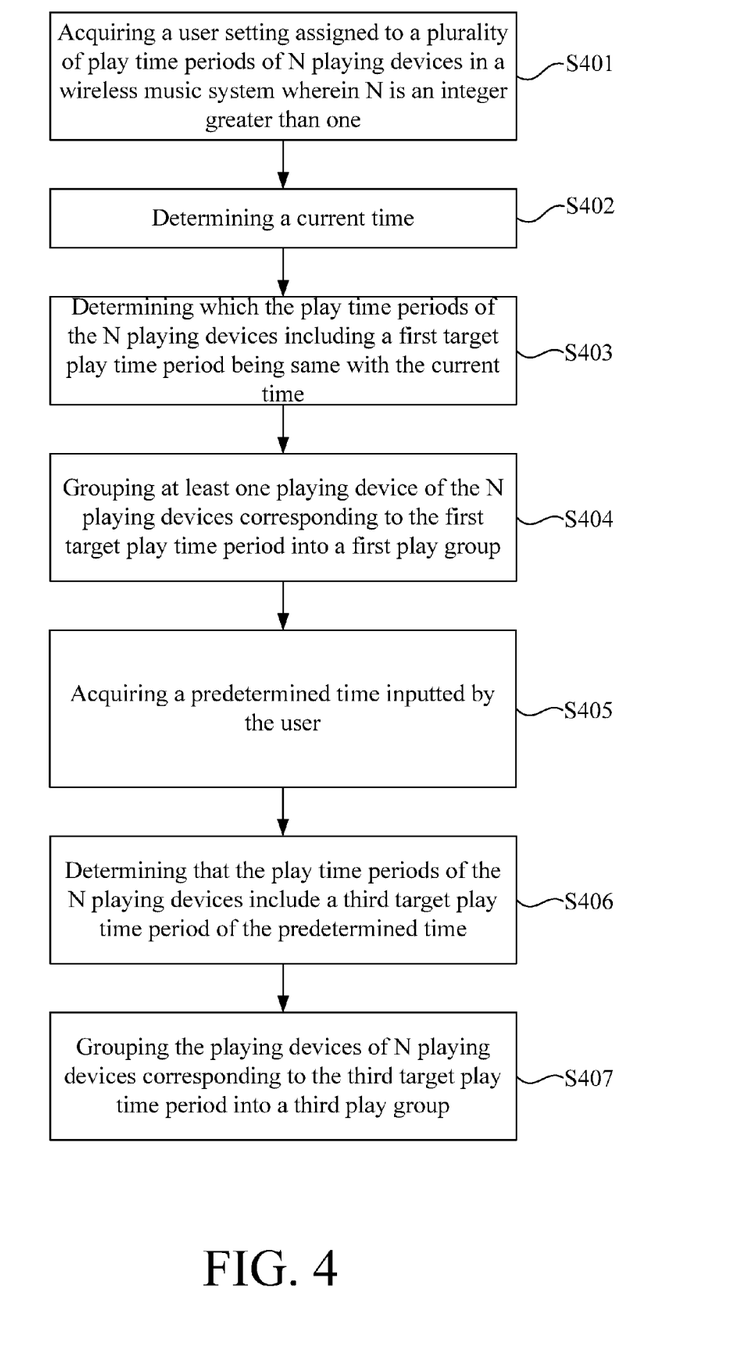
FIG. 4 is a flowchart of a method for grouping playing devices and terminal apparatus according to a fourth embodiment of the present disclosure.

FIG. 4 is a flowchart of a method for grouping playing devices and terminal apparatus according to a fourth embodiment of the present disclosure. The method includes the following blocks.

This fourth embodiment includes blocks S401-S404 similar to the first embodiment and will not be discussed in detail herein. The detailed descriptions of blocks S401-S404 refer to blocks S101-S104 respectively depicted in FIG. 1.

In block S405, a second acquisition unit 508 in FIG. 5E of the terminal apparatus acquires a predetermined time inputted by the user.

In one embodiment, the terminal is capable of acquiring the predetermined time inputted by the user where the predetermined time is any moment value which is configured by the user.

In block S406, a sixth determination unit 509 in FIG. 5E of the terminal apparatus determines which the play time periods of the N playing devices include a third target play time period of the predetermined time.

In one embodiment, the terminal regards the playing time period encompassing the current time, included in the play time periods of the N playing devices, as the third target play time period. For example, if the current time is 13:05 and some play time period is 11:00 to 14:00, the play time period regarded as the third target play time period includes the current time.

In block S407, the playing devices of N playing devices corresponding to the third target play time period are grouped into a third play group using a third grouping unit 510 in FIG. 5E of the terminal apparatus.

In at least one embodiment of the present disclosure, a user setting assigned to play time periods of N playing devices in the wireless music system is acquired where N is an integer greater than one, the current time is determined, and it is determined which the play time periods of the N playing devices include a first target play time period encompassing the current time. The playing devices of N playing devices corresponding to the first target play time periods form a first play group, the predetermined time inputted by the user is acquired, and it is determined which the play time periods of the N playing devices include a third target play time period of the predetermined time. The playing devices of N playing devices corresponding to the third target play time period are grouped into a third play group. If at least one embodiment of the present disclosure is adopted, N playing devices corresponding to the play time periods in the predetermined time are grouped into a play group after the current time for simplifying the grouping procedure and improving user experience.

FIG. 5A is a block diagram of a terminal apparatus according to a first embodiment of the present disclosure. The terminal in FIG. 5A includes a first acquisition unit 501, a first determination unit 502, a second determination unit 503 and a first grouping unit 504. The determination units can be a processor, for example.

The first acquisition unit 501 is configured to acquire a user setting assigned to play time periods of N playing devices in the wireless music system where N is an integer greater than one.

In one embodiment, the wireless music system includes N playing devices, where N is an integer greater than one. The first acquisition unit 501 acquires a user setting assigned to play time periods of N playing devices within the wireless music system where N playing device may be all or a portion of the playing devices within the wireless music system. Each playing device of the N playing devices includes at least one play time period.

The first determination unit 502 is configured to determine the current time.

The second determination unit 503 is configured to determine which the play time periods of the N playing devices acquired by the first acquisition unit 501 include a first target play time period encompassing the current time determined by the first determination unit 502.

In one embodiment, the second determination unit 503 groups the playing time period encompassing the current time, included in the play time periods of the N playing devices and determined by the first determination unit 502, into the first target play time period. For example, if the current time is 13:05 and a specific play time period is 11:00 to 14:00, the play time period grouped into the first target play time period includes the current time.

The first grouping unit 504 is configured to group the playing devices of N playing devices corresponding to the first target play time period into a first play group.

In detail, the first grouping unit 504 is capable of grouping the playing devices of N playing devices corresponding to the first target play time period, which is determined by the second determination unit 503, into a first play group.

For example, the first acquisition unit 501 acquires play time periods of three playing devices in the wireless music system where the play time periods of playing device "A" may be configured as 7:00-9:00, 11:00-13:00 and 19:00-22:00, the play time period of playing device "B" may be configured as 19:00-23:00, and the play time period of playing device "C" may be configured as 0:00-24:00. When the first determination unit 502 determines that the current time is 12:00 noon, the second determination unit 503 defines the first target play time periods to be 11:00-13:00 and 0:00-24:00 and the playing devices of N playing devices corresponding to the first target play time periods are the playing device "A" and playing device "C" so that the first grouping unit 504 groups the playing device "A" and playing device "C" into the first play group. Furthermore, while the terminal forms the first play group, the terminal is capable of controlling the device in first play group to play music synchronously.

In one embodiment, as shown in FIG. 5B, the first grouping unit 504 of terminal depicted in FIG. 5A includes a third determination unit 5041 and a first grouping sub-unit 5042.

The third determination unit 5041 is configured to determine K playing devices corresponding to the first target play time period where K is an integer greater than or equal to one.

The first grouping sub-unit 5042 is configured to group the K playing devices, which are determined by the third determination unit 5041, into the first play group.

In one embodiment, as shown in FIG. 5C, the second determination unit 503 of terminal depicted in FIG. 5A includes a detecting unit 5031 and a second determination sub-unit 5032.

The detecting unit 5031 is configured to detect that a starting time of the play time period "i" in the play time periods of N playing devices acquired by the first acquisition unit 501 is before the current time and an end time of the play time period "i" is after the current time where the play time period "i" is any one of play time periods of N playing devices.

In one embodiment, the detecting unit 5031 detects whether a starting time of the play time period "i" in the play time periods of N playing devices is before the current time and an end time of the play time period "i" is after the current time where the play time period "i" is any one of play time periods of N playing devices. In one case, if the current time is 13:05:00 and some play time period is 11:00-14:00, the current time 13:05:00 is after the starting time 11:00 of the play time period and before the end time 14:00 of the play time period. In another case, if the current time is 23:55:40 and some play time period is 23:00-04:00 where the time 23:00 is starting time of the play time period and the time 04:00 is the end time of play time period, the current time 23:55:40 is after the starting time 23:00 of the play time period and before the end time 04:00 of the play time period.

The second determination sub-unit 5032 is configured to determine that the play time period "i" is the first target play time period if the detecting unit 5031 detects that the starting time of the play time period "i" in the play time periods of N playing devices acquired by the first acquisition unit 501 is before the current time and an end time of the play time period "i" is after the current time.

In one embodiment, as shown in FIG. 5D, the terminal depicted in FIG. 5A further includes a fourth determination unit 505, a fifth determination unit 506 and a second grouping unit 507.

The fourth determination unit 505 is configured to determine that when the play time period "i" of the first target play time period is detected to be invalid, the invalid time is determined where the invalid time is the end time of play time period "i" of the playing device.

In detail, when the play time period "i" of the first target play time period is detected to be invalid, the fourth determination unit 505 determines the invalid time where the invalid time is the end time of play time period "i" of the playing device.

For example, the terminal acquires play time periods of three playing devices in the wireless music system where the play time periods of playing device "A" defines configured as 7:00-9:00, 11:00-13:00 and 19:00-22:00, the play time period of playing device "B" defines configured as 19:00-23:00, and the play time period of playing device "C" defines configured as 0:00-24:00. When the terminal determines the current time is 12:00 noon, the terminal defines the first target play time periods to be 11:00-13:00 and 0:00-24:00 and the playing devices of N playing devices corresponding to the first target play time periods are the playing device "A" and playing device "C" so that the terminal groups the playing device "A" and playing device "C" into the first play group. Furthermore, if the play time period 11:00-13:00 of first target play time period is detected to be invalid in the time 13:00, the end time 13:00 is determined to be an invalid time.

The fifth determination unit 506 is configured to determine which the play time periods of the N playing devices acquired by the first acquisition unit 501 include a second target play time period with the next second of the invalid time determined by the fourth determination unit 505.

The second grouping unit 507 is configured to group the playing devices of N playing devices corresponding to the second target play time periods, which are determined by fifth determination unit 506, into a second play group.

In one embodiment, as shown in FIG. 5E, the first grouping unit 504 of terminal depicted in FIG. 5A further includes a second acquisition unit 508, a sixth determination unit 509 and a third grouping unit 510.

The second acquisition unit 508 is configured to acquire predetermined time inputted by the user.

The sixth determination unit 509 is configured to determine which the play time periods of the N playing devices include a third target play time period of the predetermined time acquired by the second acquisition unit 508.

The third grouping unit 510 is configured to group the playing devices of N playing devices corresponding to the third target play time period, which are determined by the sixth determination unit 509, into a third play group.

In at least one embodiment of the present disclosure, a user setting assigned to play time periods of N playing devices in the wireless music system is acquired where N is an integer greater than one, the current time is determined, and it is determined which the play time periods of the N playing devices include a first target play time period. The playing devices of N playing devices corresponding to the first target play time periods form a first play group. If at least one embodiment of the present disclosure is adopted, the playing devices corresponding to play time periods of the current time in the wireless music system are grouped into play groups for simplifying the grouping procedure and improving user experience.

Figure 6:
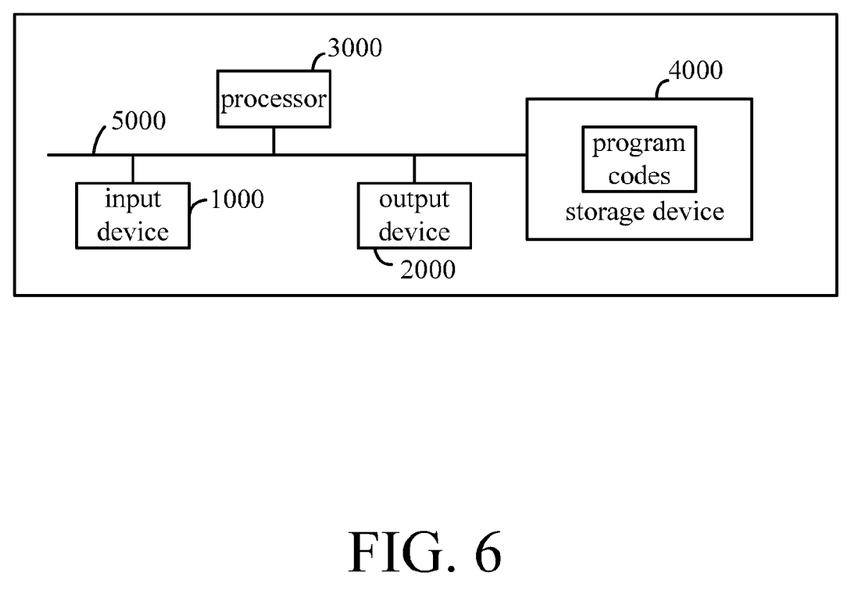
FIG. 6 is a block diagram of a terminal apparatus according to a second embodiment of the present disclosure.

FIG. 6 is a block diagram of a terminal apparatus according to a second embodiment of the present disclosure. The terminal includes at least one input device 1000, at least one output device 2000, at least one processor 3000, (central processing unit (e.g., CPU)), and a storage device 4000 where the input device 1000, output device 2000, processor 3000 and storage device 4000 are coupled to each other via a bus 5000.

In one embodiment, the input device 1000 includes a touch panel, a personal computer, a liquid crystal panel (LCD), a touch screen, and touch control buttons.

In one embodiment, the storage device 4000 includes high speed Random Access Memory (RAM) or non-volatile memory (e.g., magnetic disc storage device). The storage device 4000 is configured to store a set of program codes and the input device 1000, output device 2000 and processor 3000 are capable of executing the set of program codes stored in the storage device 4000.

The processor 3000 is configured to acquire a user setting assigned to play time periods of N playing devices in the wireless music system where N is an integer greater than one.

The processor 3000 is further configured to determine a current time.

The processor 3000 is further configured to determine which the play time periods of the N playing devices include a first target play time period encompassing the current time.

The processor 3000 is further configured to group the playing devices of N playing devices corresponding to the first target play time period into a first play group.

In one embodiment, while grouping the playing devices of N playing devices corresponding to the first target play time period into a first play group, the processor 3000 is further configured to determine K playing devices corresponding to the first target play time period where K is an integer greater than or equal to one, and to group the K playing devices into the first play group.

In one embodiment, while determining which the play time periods of the N playing devices include a first target play time period encompassing the current time, the processor 3000 is further configured to detect whether a starting time of the play time period "i" in the play time periods of N playing devices is before the current time and an end time of the play time period "i" is after the current time where the play time period "i" is any one of play time periods of N playing devices; and if the starting time of the play time period "i" is before the current time and the end time of the play time period "i" is after the current time, it is determined that the play time period "i" is a first target play time period.

In one embodiment, after grouping the playing devices of N playing devices corresponding to the first target play time period into a first play group, the processor 3000 is further configured to determine the invalid time where the invalid time is the end time of play time period "i" of the playing device when the play time period "i" of the first target play time period is detected to be invalid; determine which the play time periods of the N playing devices include a second target play time period with the next second of the invalid time; and grouping the playing devices of N playing devices corresponding to the second target play time periods into a second play group.

In one embodiment, after grouping the playing devices of N playing devices corresponding to the target play time period into a first play group, the processor 3000 is further configured to acquire the predetermined time inputted by the user; determine which the play time periods of the N playing devices include a third target play time period of the predetermined time; and group the playing devices of N playing devices corresponding to the third target play time period into a third play group.

In at least one embodiment of the present disclosure, a user setting assigned to play time periods of N playing devices in the wireless music system is acquired where N is an integer greater than one, the current time is determined and it is determined which the play time periods of the N playing devices include a first target play time period. The playing devices of N playing devices corresponding to the first target play time periods form a first play group. If at least one embodiment of the present disclosure is adopted, the playing devices corresponding to play time periods of the current time in the wireless music system are grouped into play groups for simplifying the grouping procedure and improving user experience.

Some embodiments of the present disclosure further provide a computer storage media which stores programs to implement all or partial blocks of the methods described in some embodiments of the disclosure.

Since the aforementioned embodiments focus on different aspects, the descriptions, which are not depicted in one embodiment, of some embodiments can correspondingly refer to the related content in another embodiment.

Illustratively, the above-mentioned embodiments of methods are depicted in a series of operations with a simplified description. However, person skilled in the art should be noted that the operations of the present disclosure are descriptive rather than limiting of the sequence of the operations because some operations can be sequentially or simultaneously performed. The person skilled in the art should be noted that the foregoing embodiments are depicted as preferred embodiments and thus the related operations and units are not necessarily implements in the present disclosure.

In some embodiments of the present disclosure, it should be noted that the describe devices can be implemented by different components. For example, some embodiments of above-described devices are illustrated where the unit division is based on logical function and while implementing at least one embodiment, the unit division is basis on different ways. For example, a plurality of units or members can be combined together or integrated to another system, or some features may be ignore or are not performed. Furthermore, the above-described coupling, direct couple or communication connection statuses between interactions are implemented by interfaces. The indirect coupling or communication connection between devices or units is in electrical or other statuses.

The separation of components is or is not a physically independent status. The display unit can be or is not a physical unit. In other words, the display unit may be disposed one place or arranged in network units. Based on requirement, a portion of units or all the units are configured to implement the technical schemes of the present disclosure.

Moreover, functional units in some embodiments of the present disclosure are integrated to a processing unit or each functional unit is installed independently. In another case, at least two units are assembled to single unit where the integrated unit is performed by hardware or software manner.

If the above-mentioned integrated units are implemented by software functional components and serve as independent products for sale or usage, the integrated units are stored in computer readable storage media. Based on the descriptions of embodiments, person skilled in the art clearly understands that all or partial of the technical schemes of the present disclosure can be performed by software products, hardware products, firmware products and the combinations. The software products of a computer are stored in storage media and include a plurality of instructions to allow at least one computing device to execute all or partial functions of the method wherein the computing device is selected from a group including a personal computer, a server and network device. For example, the storage media are selected from USB disk, portable hard disk drive, Random Access Memory (RAM), Read-Only Memory (ROM), Electrically Erasable Programmable Read-Only Memory (EEPROM), Compact Disc Read-Only Memory (CD-ROM) or other kinds of disc storages, magnetic storage media or other magnetic storage device, and media of which program codes with portable stored instructions or data can be accessed by the computer. In the present disclosure, the disk and disc includes compact disc (CD), laser disc, Digital Versatile Disc (DVD), floppy disk and Blue Ray disc.

As is understood by a person skilled in the art, the foregoing preferred embodiments of the present disclosure are illustrative rather than limiting of the present disclosure. It is intended that they cover various modifications and similar arrangements be included within the spirit and scope of the present disclosure, the scope of which should be accorded the broadest interpretation so as to encompass all such modifications and similar structures.

What is claimed is:

1. A method of a terminal apparatus for grouping playing devices, comprising:

acquiring a user setting input via a first acquisition unit of the terminal apparatus, the user setting assigning a plurality of play time periods of N playing devices in a wireless music system, wherein N is an integer greater than one and the wireless music system comprises the terminal apparatus wirelessly integrated;

determining a current time using a first determination unit of the terminal apparatus;

determining which play time periods of the N playing devices comprise a first target play time period encompassing the current time using a second determination unit of the terminal apparatus; and in response to a first target play time period encompassing the current time, grouping at least one playing device of the N playing devices corresponding to the first target play time period into a first play group using a first grouping unit of the terminal apparatus.

2. The method of claim 1, wherein grouping at least one playing device of the N playing devices corresponding to the first target play time period into the first play group comprises:

determining K playing devices corresponding to the first target play time period using a third determination unit of the terminal apparatus, wherein K is an integer greater than or equal to one; and grouping the K playing devices into the first play group using a first grouping sub-unit of the terminal apparatus.

3. The method of claim 2, after grouping at least one playing device of the N playing devices corresponding to the first target play time period into the first play group, the method further comprising:

determining an invalid time which is the end time of the play time period "i" of a playing device using a fourth determination unit of the terminal apparatus when the play time period "i" of the first target play time period is detected to be invalid;

determining which the play time periods of the N playing devices comprise a second target play time period with a next second of the invalid time using a fifth determination unit of the terminal apparatus; and grouping at least one playing device of the N playing devices corresponding to the second target play time period into a second play group using a second grouping unit of the terminal apparatus.

4. The method of claim 2, after grouping at least one playing device of the N playing devices corresponding to the first target play time period into the first play group, the method further comprising:

acquiring a predetermined time inputted by the user using a second acquisition unit of the terminal apparatus;

determining which the play time periods of the N playing devices comprise a third target play time period with the predetermined time using a sixth determination unit of the terminal apparatus; and grouping at least one playing device of the N playing devices corresponding to the third target play time period into a third play group using a third grouping unit of the terminal apparatus.

5. The method of claim 1, wherein determining which the play time periods of the N playing devices comprising the first target play time period encompassing the current time comprises:

detecting that a starting time of a play time period "i" in the play time periods of the N playing devices is before the current time and an end time of the play time period "i" is after the current time using a detecting unit of the terminal apparatus, wherein the play time period "i" is any one of play time periods of the N playing devices; and if the starting time of the play time period "i" is before the current time and the end time of the play time period "i" is after the current time, determining which the play time period "i" is the first target play time period using a second determination sub-unit of the terminal apparatus.

6. The method of claim 5, after grouping at least one playing device of the N playing devices corresponding to the first target play time period into the first play group, the method further comprising:

determining an invalid time which is the end time of the play time period "i" of a playing device using a fourth determination unit of the terminal apparatus when the play time period "i" of the first target play time period is detected to be invalid;

determining which the play time periods of the N playing devices comprise a second target play time period with a next second of the invalid time using a fifth determination unit of the terminal apparatus; and grouping at least one playing device of the N playing devices corresponding to the second target play time period into a second play group using a second grouping unit of the terminal apparatus.

7. The method of claim 5, after grouping at least one playing device of the N playing devices corresponding to the first target play time period into the first play group, the method further comprising:

acquiring a predetermined time inputted by the user using a second acquisition unit of the terminal apparatus;

determining which the play time periods of the N playing devices comprise a third target play time period with the predetermined time using a sixth determination unit of the terminal apparatus; and grouping at least one playing device of the N playing devices corresponding to the third target play time period into a third play group using a third grouping unit of the terminal apparatus.

8. The method of claim 1, after grouping at least one playing device of the N playing devices corresponding to the first target play time period into the first play group, the method further comprising:

determining an invalid time which is an end time of the play time period "i" of a playing device using a fourth determination unit of the terminal apparatus when the play time period "i" of the first target play time period is detected to be invalid;

determining which the play time periods of the N playing devices comprise a second target play time period with a next second of the invalid time using a fifth determination unit of the terminal apparatus; and grouping at least one playing device of the N playing devices corresponding to the second target play time period into a second play group using a second grouping unit of the terminal apparatus.

9. The method of claim 1, after grouping at least one playing device of the N playing devices corresponding to the first target play time period into the first play group, the method further comprising:

acquiring a predetermined time inputted by the user using a second acquisition unit of the terminal apparatus;

determining which the play time periods of the N playing devices comprise a third target play time period encompassing the predetermined time using a sixth determination unit of the terminal apparatus; and grouping at least one playing device of the N playing devices corresponding to the third target play time period into a third play group using a third grouping unit of the terminal apparatus.

10. A terminal apparatus, comprising:

a first acquisition unit configured to acquire a user setting assigned to a plurality of play time periods of N playing devices in a wireless music system, wherein N is an integer greater than one and the wireless music system comprises the terminal apparatus wirelessly integrated;

a first determination unit configured to determine a current time;

a second determination unit configured to determine which play time periods of the N playing devices acquired by the first acquisition unit comprise a first target play time period encompassing the current time determined by the first determination unit; and a first grouping unit configured to group at least one playing device of the N playing devices corresponding to the first target play time period determined by the second determination unit into a first play group in response to the first target play time period encompassing the current time.

11. The terminal apparatus of claim 10, wherein the first grouping unit further comprises:

a third determination unit configured to determine K playing devices corresponding to the first target play time period, wherein K is an integer greater than or equal to one; and a first grouping sub-unit configured to group the K playing devices determined by the third grouping unit into the first play group.

12. The terminal apparatus of claim 11, further comprising:

a fourth determination unit configured to determine an invalid time which is the end time of the play time period "i" of a playing device when the play time period "i" of the first target play time period is detected to be invalid;

a fifth determination unit configured to determine which the play time periods of the N playing devices acquired by the first acquisition unit comprise a second target play time period with a next second of the invalid time determined by the fourth determination unit; and a second grouping unit configured to group at least one playing device of the N playing devices corresponding to the second target play time periods, which are determined by the fifth determination unit, into a second play group.

13. The terminal apparatus of claim 11, further comprising:

a second acquisition unit configured to acquire a predetermined time inputted by the user;

a sixth determination unit configured to determine which the play time periods of the N playing devices comprise a third target play time period of the predetermined time acquired by the second acquisition unit; and a third grouping unit configured to group the playing devices of N playing devices corresponding to the third target play time period, which are determined by the sixth determination unit, into a third play group.

14. The terminal apparatus of claim 10, wherein the second determination unit further comprises:

a detecting unit configured to detect that a starting time of a play time period "i" in the play time periods of the N playing devices acquired by the first acquisition unit is before the current time and an end time of the play time period "i" is after the current time, wherein the play time period "i" is any one of play time periods of the N playing devices; and a second determination sub-unit configured to determine which the play time period "i" is the first target play time period if the detecting unit detects that the starting time of the play time period "i" in the play time periods of N playing devices acquired by the first acquisition unit is before the current time and an end time of the play time period "i" is after the current time.

15. The terminal apparatus of claim 14, further comprising:

a fourth determination unit configured to determine an invalid time which is the end time of the play time period "i" of a playing device when the play time period "i" of the first target play time period is detected to be invalid;

a fifth determination unit configured to determine which the play time periods of the N playing devices acquired by the first acquisition unit comprise a second target play time period with a next second of the invalid time determined by the fourth determination unit; and a second grouping unit configured to group at least one playing device of the N playing devices corresponding to the second target play time periods, which are determined by the fifth determination unit, into a second play group.

16. The terminal apparatus of claim 14, further comprising:

a second acquisition unit configured to acquire a predetermined time inputted by the user;

a sixth determination unit configured to determine which the play time periods of the N playing devices comprise a third target play time period of the predetermined time acquired by the second acquisition unit; and a third grouping unit configured to group the playing devices of N playing devices corresponding to the third target play time period, which are determined by the sixth determination unit, into a third play group.

17. The terminal apparatus of claim 10, further comprising:

a fourth determination unit configured to determine an invalid time which is the end time of the play time period "i" of a playing device when the play time period "i" of the first target play time period is detected to be invalid;

a fifth determination unit configured to determine which the play time periods of the N playing devices acquired by the first acquisition unit comprise a second target play time period with a next second of the invalid time determined by the fourth determination unit; and a second grouping unit configured to group at least one playing device of the N playing devices corresponding to the second target play time periods, which are determined by the fifth determination unit, into a second play group.

18. The terminal apparatus of claim 10, further comprising:

a second acquisition unit configured to acquire a predetermined time inputted by the user;

a sixth determination unit configured to determine which the play time periods of the N playing devices comprise a third target play time period of the predetermined time acquired by the second acquisition unit; and a third grouping unit configured to group the playing devices of N playing devices corresponding to the third target play time period, which are determined by the sixth determination unit, into a third play group.

19. A computing device comprising a computer readable media and a processor, wherein the computer readable media stores therein at least one application program, the computing device executes the at least one application program using the processor, and the computing device performs a method comprising:

receiving a user setting input via an input device of a terminal apparatus, the user setting assigning a plurality of play time periods of N playing devices in a wireless music system, wherein N is an integer greater than one and the wireless music system comprises the terminal apparatus wirelessly integrated;

determining, via a processor of the terminal apparatus, a current time to be stored in a storage device of the terminal apparatus; and in response to play time periods of the N playing devices comprising a first target play time period encompassing the current time stored in the storage device, grouping at least one playing device of the N playing devices corresponding to the first target play time period into a first play group using the processor.

20. The computing device of claim 19, wherein determining which the play time periods of the N playing devices comprising the first target play time period encompassing the current time comprises:

the processor configured to detect that a starting time of a play time period "i" in the play time periods of the N playing devices is before the current time and an end time of the play time period "i" is after the current time, wherein the play time period "i" is any one of play time periods of the N playing devices by the at least one application program; and if the starting time of the play time period "i" is before the current time and the end time of the play time period "i" is after the current time, the processor being configured to determine which the play time period "i" is the first target play time period by the at least one application program.

* * * * *